ent Office 2,926,700
Patented Mar. 1, 1960

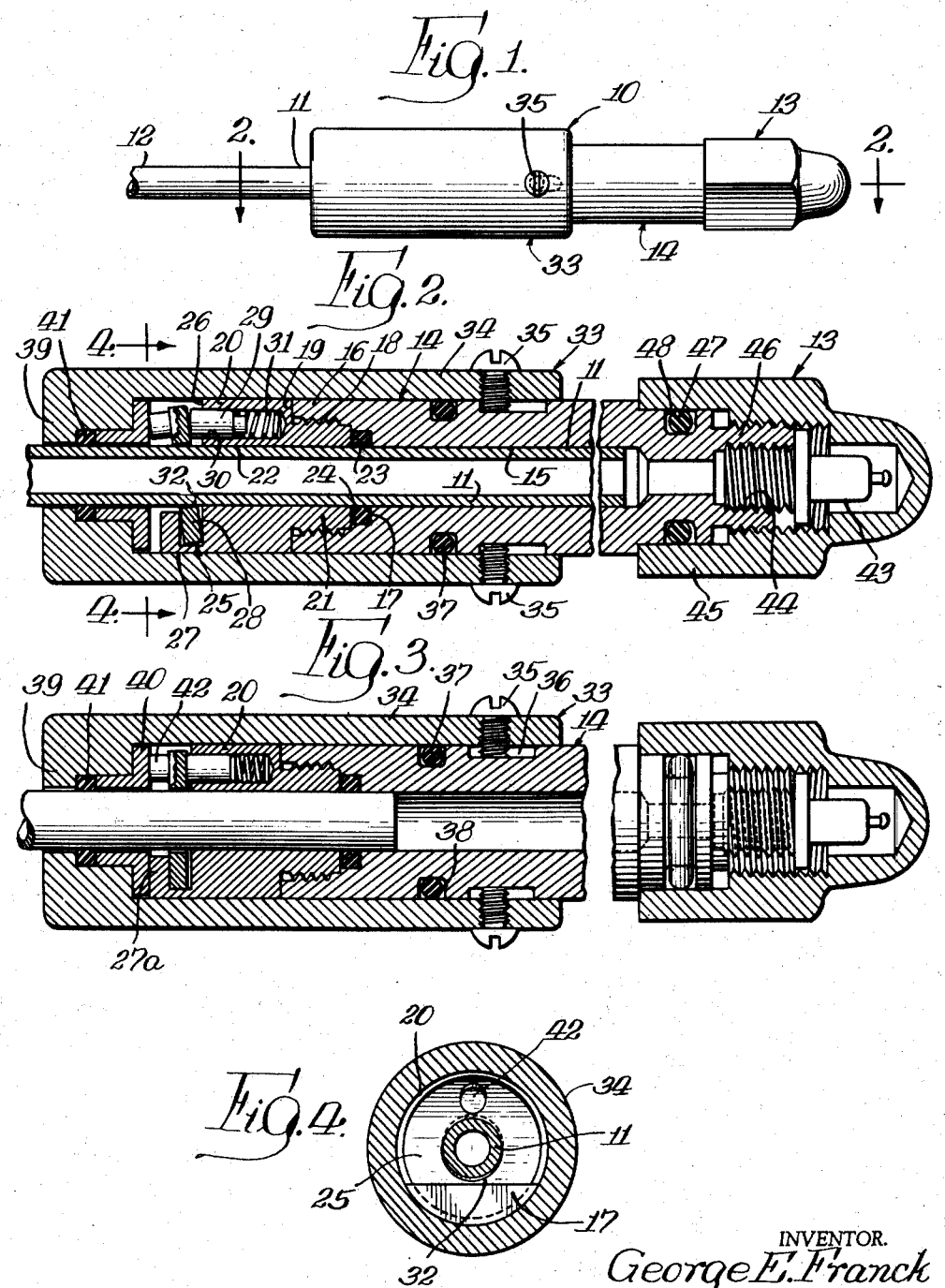

2,926,700

QUICK CONNECT FITTING

George E. Franck, Riverside, Ill., assignor to The Imperial Brass Manufacturing Company, a corporation of Illinois Application September 22, 1958, Serial No. 762,398

7 Claims. (Cl. 138—89)

This invention relates to fittings and in particular to quick connect fittings for use with straight ended tubes.

In installations, such as installations of air conditioning equipment, it has been found desirable to provide fittings which may be quickly connected to the end of tubing therein, such as for testing the installation for leaks. While a number of such quick connect fittings are known in the art, the known fittings possess such disadvantages as complexity of construction and resulting high cost, difficulty of proper installation and removal, and inability to effect a positive sealed connection.

The principal object of this invention is to provide a new and improved quick connect fitting.

Another object is to provide such a quick connect fitting having new and improved means for locking the fitting to the tube end in a desired arrangement.

A further object is to provide such a fitting having new and improved means for manipulating the locking means to provide facilitated installation and removal of the fitting on the tube end.

Still another object is to provide such a fitting having new and improved means for effecting desirable sealing of the fitting to a tube end.

Other features and advantages of the invention will be apparent from the following description taken in connection with the accompanying drawing, wherein:

Fig. 1 is a plan view of a fitting embodying the invention, installed on an end portion of a straight ended tube;

Fig. 2 is an enlarged, broken, diametrical section taken approximately along the line 2—2 of Fig. 1;

Fig. 3 is a diametrical section similar to that of Fig. 2 but with the elements arranged as during longitudinal movement of the fitting relative to the tube end; and Fig. 4 is a transverse section taken approximately along the line 4—4 of Fig. 2.

In the exemplary embodiment of the invention, as disclosed in the drawing, a quick connect fitting generally designated 10 is shown in association with a straight end portion 11 of a tube 12 such as a copper tube used in an air conditioning installation (not shown). Fitting 10 is arranged to be telescoped over the end portion 11 and to effect an automatic locking and sealing connection with the tube end permitting substantial pressures to be introduced within the tube, as for testing the same. In the illustrated embodiment, the fitting includes a valve means 13 permitting alternative introduction and removal of pressurized fluid as desired.

More specifically, fitting 10 comprises a body 14 having a bore 15 therethrough. The diameter of bore 15 is preferably slightly larger than the outer diameter of tube end 11 permitting ready telescopic association of the body and the tube end. At the inner end 16 of body 14, the bore is successively stepped to provide an enlarged cylindrical portion 17 and a more greatly enlarged internally threaded portion 18 opening into a radial end face 19 of the body member.

An annular sealing block 20 is secured to body end 16 by means of an exteriorly threaded end portion 21 engaging bore threaded portion 18. Block 20 is provided with a bore 22 comprising a coaxial extension of bore 15 of the body 14.

The longitudinal extent of threaded end 21 of block 20 is preferably comparable to the longitudinal extent of threaded bore portion 18 so that when the block 20 is threaded fully into body 14 to abut end face 19 of the body, a radial end face 23 of block end 21 axially compresses an O-ring 24 in body bore portion 17 to effect a desired seal between tube end 11 and body 14.

In installing fitting 10 on tube end 11, the tube end 11 is caused to pass through bore 22 into bore 15 of body 14. During such installation, it is desirable to permit free movement relative to the tube end. Once the fully inserted disposition of tube end 11 is obtained, it is desirable to effect an automatic locking operation precluding movement between the fitting and the tube end. Further, it is desirable to permit a ready disassociation of the fitting from the tube end when desired. The instant invention comprehends new and improved means for automatically effecting such desired locked and released conditions. More specifically, the locking association is effected by means of a locking ring 25 disposed coaxially of bore 22 adjacent the outer end 26 of block 20. The internal diameter of ring 25 is slightly larger than the external diameter of tube end 11 to permit free movement of the tube end through ring 25 when the ring is arranged parallel to a plane transverse to the bore axis (Fig. 3). However, locking ring 25 is normally biased to extend angularly to the transverse plane so as to engage diametrically opposite portions of tube 11 (Fig. 2). The means for effecting this angular arrangement comprises a flange portion 27 extending from block end 26 which pivotally retains a peripheral portion 28 of locking ring 25. A plunger 29 is slidably received in a cylindrical recess 30 extending parallel to the axis of bore 22 in a portion of block 20 diametrically opposite flange 27. The plunger is biased by a spring 31 to bear against locking ring 25 and pivot the ring about flange 27 to an angular disposition relative to the axis of tube 11. This causes the inner portion 32 of locking ring 25 to engage lockingly the tube 11 and preclude relative outward movement of tube 11 from body 14.

When it is desired to disassociate the fitting from tube end 11, locking ring 25 is pivoted against the action of spring 31 to the transverse arrangement of Fig. 3. This is effected by means of a control member 33 having a tubular portion 34 reciprocably telescoped on body 14 and the extension of body 14 defined by block 20. Control member 33 is retained in the telescoped association by screws 35 secured to the control member and projecting into recesses 36 in body 14. The control member may be movably sealed to the body 14 by means of an O-ring 37 installed in a groove 38 in body 14.

At one end of tubular portion 34, the control member is provided with a transverse, radially inwardly extending portion 39 provided with an annular insert 40 urged by the action of plunger 29 against an O-ring 41 for effecting a seal between the control member and the tube end. Locking ring 25 is provided with a projection 42 which is engaged by insert 40, when the control member 33 is urged to the right, as seen in Fig. 3, to pivot the locking ring 25 to the transverse arrangement permitting ready movability between the fitting and tube end. The axial length of projection 42 is preferably comparable to the axial width of flange outer portion 27a. Thus, when insert 40 is moved to the right (Fig. 3) to its extreme movement wherein it abuts flange portion 27a, the spacing of the diametrically opposite portions of the locking ring (at flange portion 27a and projection 42) is exactly equal, assuring a true transverse disposition of the locking ring.

As alluded to briefly above, in the illustrated embodiment, the fitting 10 is provided with a valve means 13 for controlling flow of pressurized fluid to and from the interior of tube 12. More specifically, valve means 13 comprises a conventional tire valve 43 threadably secured to a threaded portion 44 defining an end of body bore 15. A cap 45 may be threadedly secured over a threaded end 46 of body 14 to enclose valve 43. An O-ring 47 is received in an annular groove 48 provided in body end 46 for sealing cap 45 to the body end.

From the foregoing, it may be seen that the fitting 10 comprises an improved, simplified and inexpensive quick connect fitting structure. In use, fitting 10 provides an improved facility and positiveness of operation heretofore not found in the art. To install fitting 10 on tube end 11, it is merely necessary to effect a relative movement of the fitting and tube end to insert the tube end through control member portion 39, block 20, and at least partially into bore 15 of the body 14, as locking ring 25 has no effect on the tube when so inwardly moving. Thus installed, a leak-proof connection of the fitting to the tube end is automatically effected. Movement of the tube end outwardly from bore 15 is positively precluded by the engagement of locking ring portion 32 with the tube. Proper sealing of the fitting to the tube end is effected by the controlled axial compression of O-rings 24 and 41 and the sealing action of O-rings 37 and 47. If it is desired to admit or release fluid pressure relative to the tube, valve 43 may be suitably utilized.

To remove fitting 10 from tube end 11, the user merely urges control member 33 more fully over body 14, thereby pivoting the locking ring from the locking position of Fig. 2 to the released position of Fig. 3, whereupon the fitting may be readily withdrawn from the tube end, as desired. Thus, the fitting is adapted for use in numerous successive installations. In addition, because of the improved locking and sealing action, the fitting provides improved functioning in applications where it is desired that the fitting remain installed on the tube end.

While I have shown and described certain features of my invention, it is to be understood that it is capable of many modifications. Changes, therefore, in the construction and arrangement may be made without departing from the spirit and scope of the invention as defined in the appended claims.

I claim:

1. A quick connect fitting for use with straight-ended tubes, comprising: a body having a bore therethrough adapted to receive the end of a tube; a control member having a first portion limitedly slidable on the body parallel to said bore and a second portion spaced from the body adjacent one end of the bore; a locking ring coaxial of the bore and disposed between said body and said transverse portion, the internal diameter of the ring being slightly larger than the outer diameter of the tube; and biasing means carried by the body urging the locking ring pivotally from a plane transverse to the bore axis into engagement with the tube to preclude longitudinal movement of the tube in one direction relative to the body, said control member being movable in a direction to urge said second portion against said locking ring to overcome said biasing means and arrange the locking ring transversely to the bore axis to permit longitudinal movement of the tube in said one direction relative to the body as desired.

2. A quick connect fitting for use with straight-ended tubes, comprising: a body having a bore therethrough adapted to receive the end of a tube; a control member having a first portion carried by the body to be reciprocable parallel to said bore and a transverse portion spaced from the body adjacent one end of the bore; means associated with the body and control member limiting the reciprocable movement of the control member relative to the body; a locking ring coaxial of the bore and disposed between said body and said transverse portion, the internal diameter of the ring being slightly larger than the outer diameter of the tube; and means carried by the body urging the locking ring pivotally from a plane transverse to the bore axis into engagement with the tube to preclude longitudinal movement of the tube in one direction relative to the body, the means limiting the reciprocable movement of the control member comprising a pair of shoulders on one of said body and said control member and spaced parallel to said bore, and an element on the other of said body and control member projecting to between said shoulders for abutment selectively therewith at the opposite limits of the control member movement.

3. A quick connect fitting for use with straight-ended tubes, comprising: a body having a bore therethrough adapted to receive the end of a tube; a control member having a first portion limitedly slidable on the body parallel to said bore, and a transverse portion spaced from the body adjacent one end of the bore; a locking ring coaxial of the bore and disposed between said body and said transverse portion, the internal diameter of the ring being slightly larger than the outer diameter of the tube; means associated with the body limiting movement of the locking ring to pivotal movement about an axis transverse to and spaced from the bore axis; and means associated with the body urging the locking ring pivotally away from a plane transverse to the bore axis into engagement with the tube to preclude longitudinal movement of the tube in one direction relative to the body.

4. The quick connect fitting of claim 3 wherein the means urging the locking ring away from the transverse plane comprises spring means resiliently extendible parallel to the bore axis.

5. The quick connect fitting of claim 3 wherein each of said means associated with the body is carried by an annular block secured to the body and peripherally congruent with the body to provide an extended sliding support of the control member.

6. The quick connect fitting of claim 3 wherein the locking ring is provided with a projection extending transversely thereto and into abutment with the transverse portion of the control member.

7. The quick connect fitting of claim 6 wherein the transverse portion of the control member is provided with an insert, and a sealing ring is axially compressed between the insert and the transverse portion to expand radially inwardly for sealing the control member to the tube.

References Cited in the file of this patent

UNITED STATES PATENTS

| 1,933,117 | Markle | Oct. 31, 1933 |
| 2,188,990 | Whitney | Feb. 6, 1940 |
| 2,819,733 | Maisch | Jan. 4, 1958 |